(12) United States Patent
Rauser

(10) Patent No.: US 8,408,386 B1
(45) Date of Patent: Apr. 2, 2013

(54) CATWALK AND CONVEYOR SUPPORT SYSTEM FOR GRAIN HANDLING

(76) Inventor: Claire M. Rauser, Fargo, ND (US)

(\*) Notice: Subject to any disclaimer, the term of this patent is extended or adjusted under 35 U.S.C. 154(b) by 81 days.

(21) Appl. No.: 13/031,820

(22) Filed: Feb. 22, 2011

(51) Int. Cl.
*B65G 21/08* (2006.01)

(52) U.S. Cl. ...................................... 198/860.1; 198/346

(58) Field of Classification Search ............... 198/860.1, 198/860.3, 861.1, 346; 414/508; 182/42, 182/43
See application file for complete search history.

(56) References Cited

U.S. PATENT DOCUMENTS

| | | | |
|---|---|---|---|
| 3,420,211 A | \* | 1/1969 | Hartvickson ................. 198/346 |
| 6,447,234 B2 | \* | 9/2002 | Sinn et al. ..................... 198/812 |
| 7,125,215 B2 | \* | 10/2006 | Kinzer ....................... 198/861.6 |
| 7,267,518 B2 | \* | 9/2007 | Kinzer ....................... 198/861.6 |

\* cited by examiner

*Primary Examiner* — James R Bidwell
(74) *Attorney, Agent, or Firm* — Neustel Law Office

(57) ABSTRACT

A catwalk and conveyor support system adapted to be disassembled and including one or more raised sections each having a catwalk with a walkway and guard rails, and conveyor supports. Each of the conveyor supports have a vertical and a horizontal section, wherein the vertical section is adjustably connected to the catwalk and the horizontal section vertically adjusts with respect to the catwalk via the vertical section. The conveyor supports are arranged in a linear manner and are independently adjustable relative each other and relative the catwalk. Multiple raised sections may be used and are generally connected in a serial manner between storage receptacles. One or more conveyors for transporting the granular material between storage receptacles are supported upon the horizontal sections of the conveyor supports, wherein an angular disposition of the conveyors relative the catwalk is adjusted via vertical adjustment of one or more of the conveyor supports.

16 Claims, 9 Drawing Sheets

US 8,408,386 B1

CATWALK AND CONVEYOR SUPPORT SYSTEM FOR GRAIN HANDLING

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to grain handling sites and more specifically it relates to a catwalk and conveyor system for grain handling for efficiently monitoring and conveying granular material being storage receptacles.

2. Description of the Related Art

Any discussion of the related art throughout the specification should in no way be considered as an admission that such related art is widely known or forms part of common general knowledge in the field.

Granular material is often stored and dried within silos or bins, wherein the size and shape of the receptacles can vary and depend upon various factors, such as the volume of granular material to be stored, the number of receptacles, and the terrain, among others. The granular material must also often be transported between storage receptacles, such as including other silos or bins, shipping containers, etc. Because of the different size and shape of the storage receptacles, as well as sloped terrain, the angle that the conveyor travels must often be adjusted with respect to the storage receptacles or catwalk.

Currently, the prior art does not teach a catwalk and conveyor support system permitting easy set-up or transport, as well as angular adjustment of the conveyor support with respect to the catwalk and/or surrounding storage receptacles. Because of the inherent problems with the related art, there is a need for a new and improved catwalk and conveyor support system for grain handling for permitting easy transport and assembly, as well as permitting adjustability of conveyor supports.

BRIEF SUMMARY OF THE INVENTION

The invention generally relates to grain handling sites and a system for efficiently monitoring and conveying granular material being storage receptacles which includes one or more raised sections each having a catwalk with a walkway and guard rails, and a plurality of conveyor supports, each raised section permitting for complete disassemble. Each of the conveyor supports have a vertical section and a horizontal section, wherein the vertical section is adjustably connected to the catwalk and the horizontal section vertically adjusts with respect to the catwalk via the vertical section. The conveyor supports are arranged in a linear manner and are independently adjustable relative each other and relative the catwalk. Multiple raised sections may be used and are generally connected in a serial manner between storage receptacles. One or more conveyors for transporting the granular material between storage receptacles are supported upon the horizontal sections of the conveyor supports, wherein an angular disposition of the conveyors relative the catwalk is adjusted via vertical adjustment of one or more of the conveyor supports.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
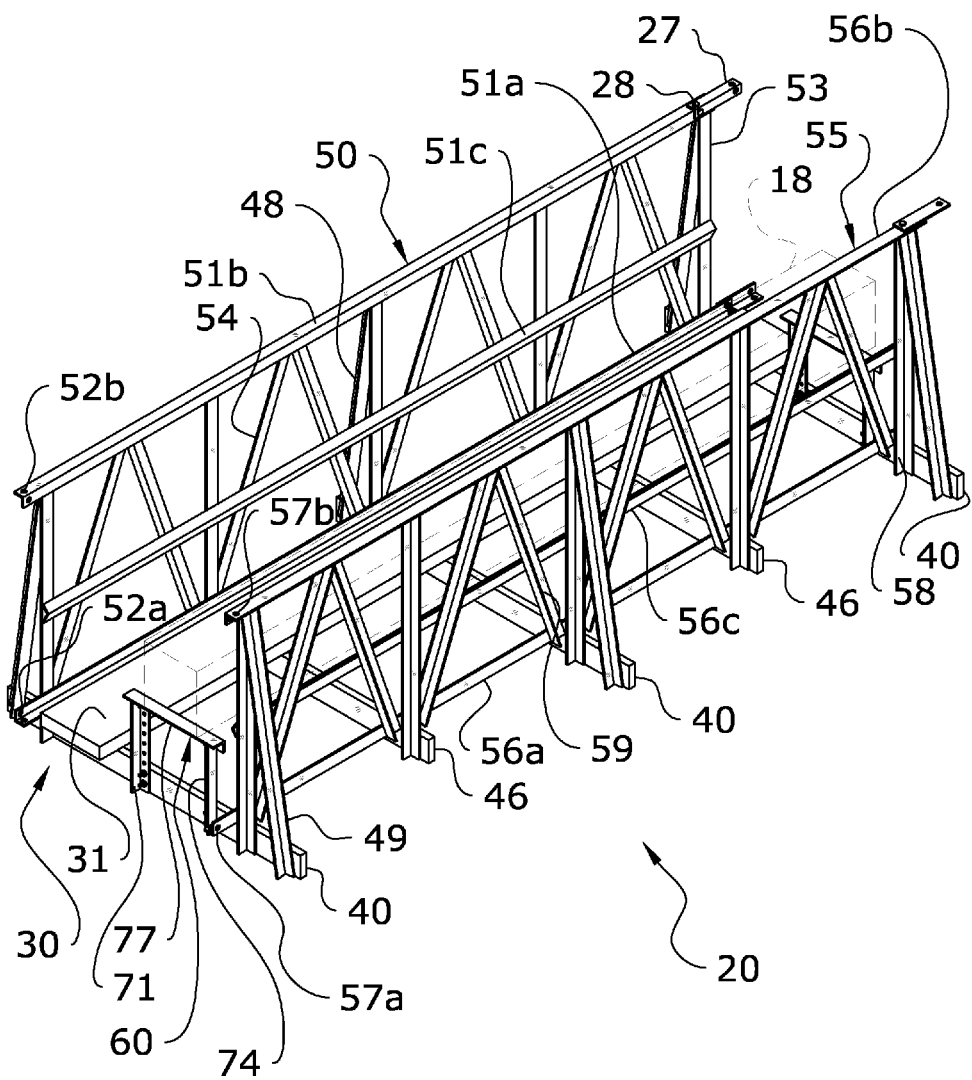
FIG. 1 is an upper perspective view of the raised section with the conveyor supported in a raised, level position.

Turning now descriptively to the drawings, in which similar reference characters denote similar elements throughout the several views, FIGS. 1 through 9 illustrate a catwalk and conveyor system for grain handling 10, which comprises one or more raised sections 20 each having a catwalk 30 with a walkway 31 and guard rails 50, 55, and a plurality of conveyor supports 60. Each of the conveyor supports 60 have a vertical section 70 and a horizontal section 77, wherein the vertical section 70 is adjustably connected to the catwalk 30 and the horizontal section 77 vertically adjusts with respect to the catwalk 30 via the vertical section 70. The conveyor supports 60 are arranged in a linear manner and are independently adjustable relative each other and relative the catwalk 30.

One or more conveyors 18 for transporting the granular material between or leading to or from a storage receptacle 12 are supported upon the horizontal sections 77 of the conveyor supports 60, wherein an angular disposition of the conveyors 18 relative the catwalk 30 is adjusted via vertical adjustment of one or more of the conveyor supports 60. Multiple raised sections 20, 20' may be used and are generally connected in a serial manner between storage receptacles 12, 12'. It is appreciated that the terms "receptacle", "conveyor", and "raised section" are commonly referred to in the singular form throughout the description; however various grain handling sites may require more than one "receptacle", "conveyor", and/or "raised section" and thus the singular form of the element is not to be limiting and simply used for simplification.

B. Storage Receptacles

The storage receptacles 12 are generally for holding a granular material, such as grain or other particular matter. The storage receptacles 12 may be comprised of conventional silos, grain bins, grain elevators, shipping containers or trucks, or be of various other types. The storage receptacles 12 may receive the granular material through a roof opening or other location. The storage receptacles 12 may be of different sizes or types from one another as appreciated.

C. Conveyors

One or more conveyors 18 extend between the storage receptacles 12 and are supported upon the raised section 20 for transferring the granular material. The conveyor 18 may be comprised of a circulating belt structure, an auger, or other conveying apparatuses. The conveyor 18 may be exposed, partially enclosed, or fully encloses. In addition, feeding tubes 19, 19' or other guide structures are generally used to direct the granular material from the respective conveyor 18 into the storage receptacles 12, 12'.

Figure 8:
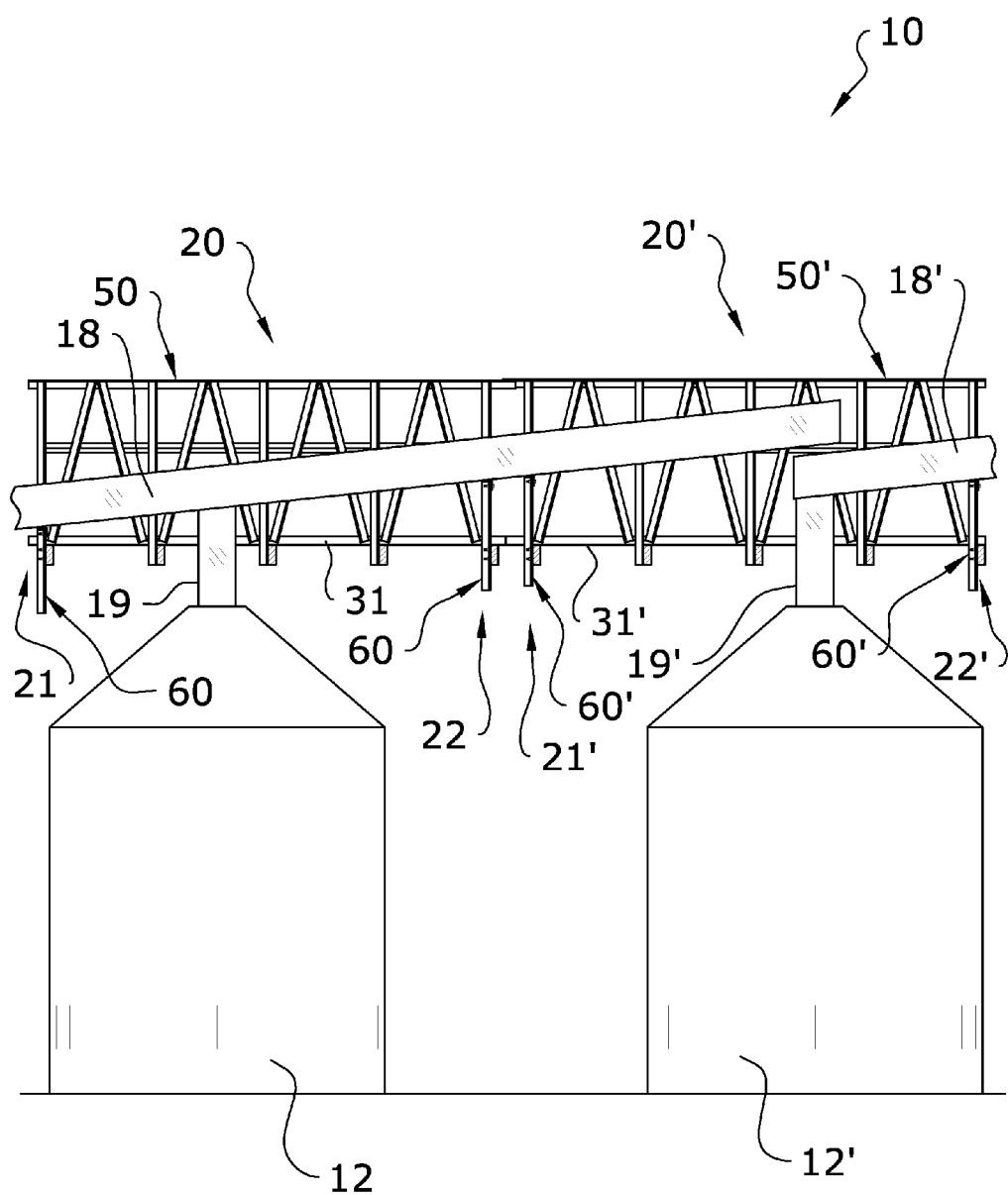
FIG. 8 is an exemplary side view of a first and second raised section connected to each other, with the walkways substantially flush and the conveyor supports each arranged in an inclined manner so that the first conveyor supported by the first raised section dumps into the second conveyor of the second raised section.

Because of the extensive length between some storage receptacles 12, it may be necessary to have multiple staggered conveyors 18, 18' as best illustrated in FIG. 8, to at least reduce a horsepower requirement of the drive unit of the conveyors 18. It is appreciated that the term "conveyor" herein is meant to include the actual conveying mechanism as well as any enclosure, casing, or support structure for the conveying mechanism that would actually attach or rest upon the conveyor supports 60.

D. Raised Section

Figure 7:
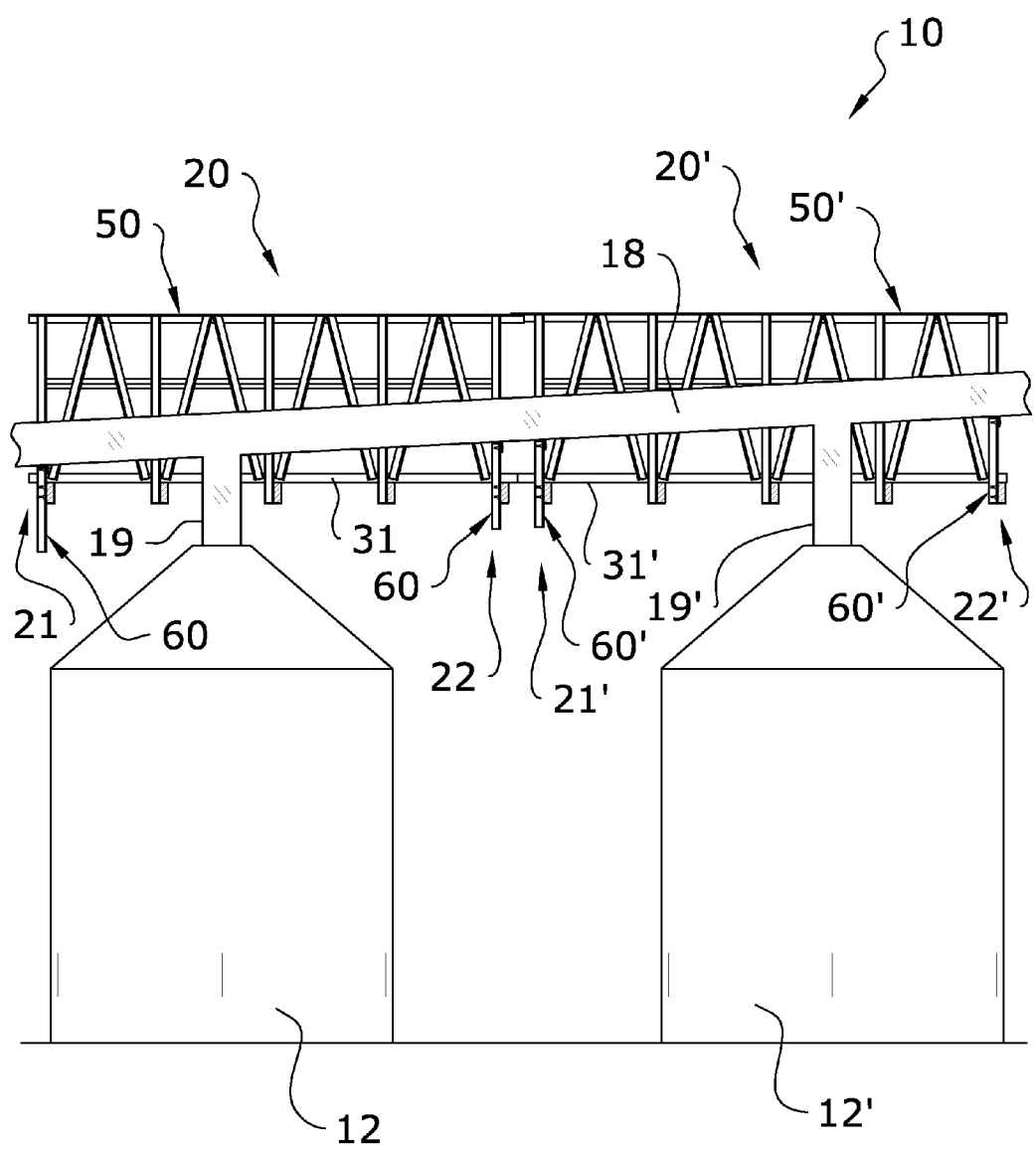
FIG. 7 is an end view of the raised section with the conveyor supported in a lowered position.

The raised sections 20, 20' are generally connected between storage receptacles in a serial manner such that each of the raised sections 20, 20' include a first end 21, 21' and an opposite second end 22, 22', and the second end 22 of a first raised section 20 aligns and connects to a first end 21' of a second raised section 20' as illustrated in FIGS. 7 through 8. Generally, a plurality of connecting brackets 27 are used to connect adjacent raised sections 20, 20' as will be described. However, as illustrated in FIGS. 7 and 8, the rail assemblies 50, 55 and walkway 31 may overlap to connect adjacent raised sections 20, 20'. It is appreciated that multiple fasteners (not shown) may be used for securement of the adjacent raised sections 20, 20' in the overlapping embodiment.

Figure 3:
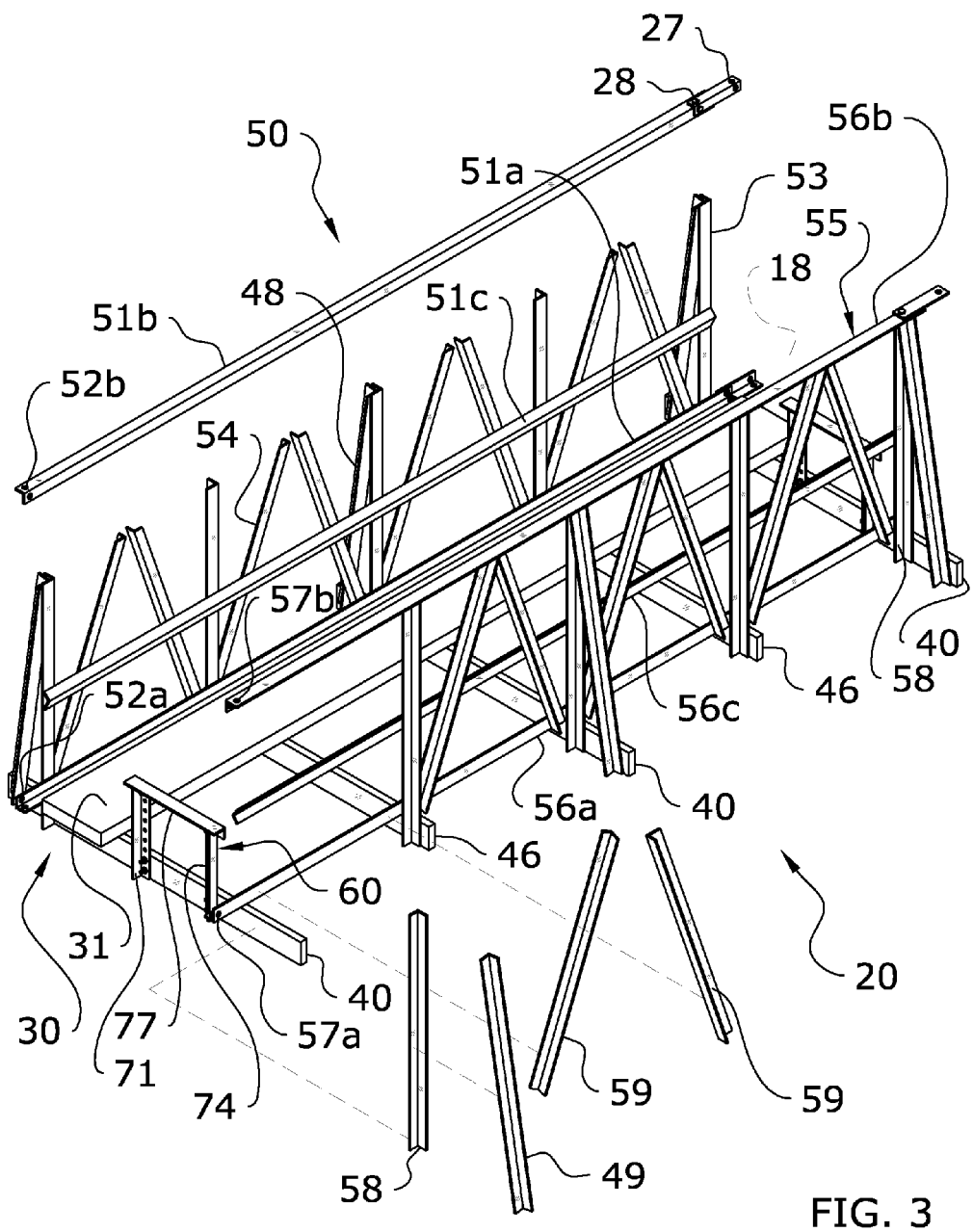
FIG. 3 is an upper perspective view of the raised section partially disassembled.
Figure 4:
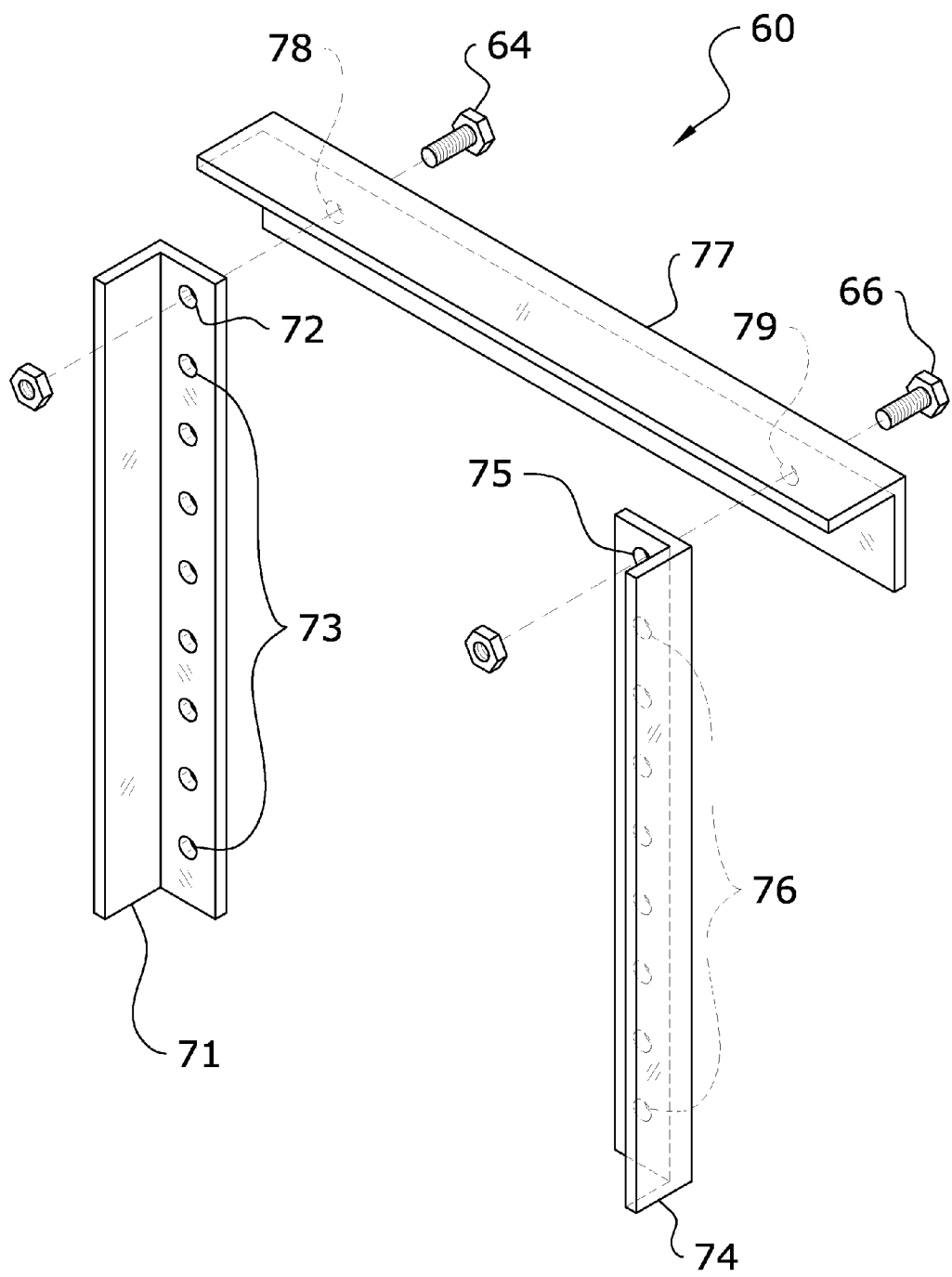
FIG. 4 is an exploded upper perspective view of the conveyor support.

The raised section 20 may be supported from the ground via the storage receptacles 12 or various support structures (not illustrated). The raised section 20 is generally able to be completely disassembled as illustrated in FIG. 3, such as each member of the catwalk 30 including each rail of the rail assemblies 50, 55 and conveyor supports 60 are able to be removed from one another to allow for easy transport and storage of the raised section 20 when not in use. The raised section 20 is generally permitted to be completely disassembled via components being bolted or fastened together with removable fasteners rather than using welding or other permanent fastening methods. The raised section 20 may be comprised of various materials, such as but not limited to metal for providing a durable, strong, and substantially weather-resistant structure.

i. Catwalk

Figure 2:
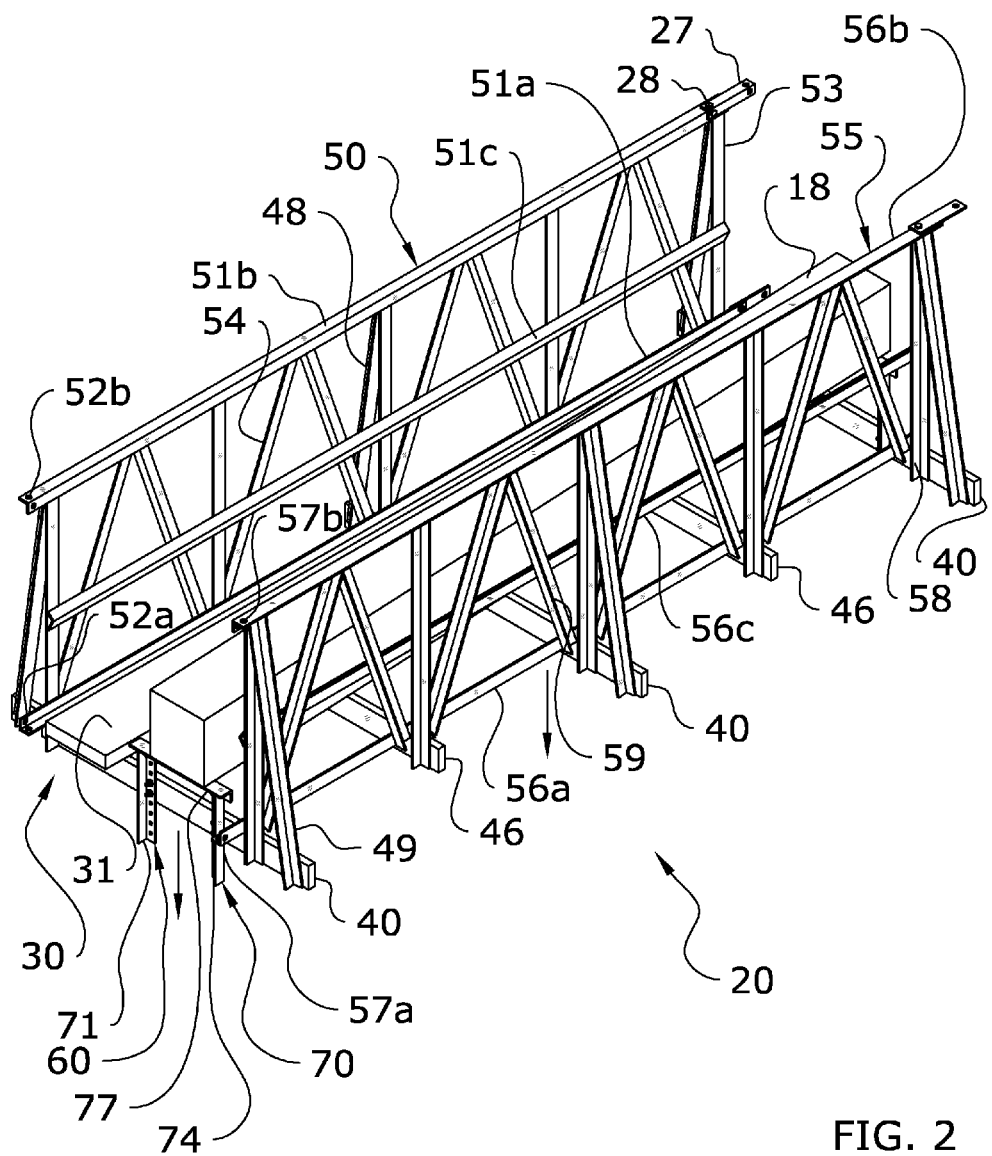
FIG. 2 is an upper perspective view of the raised section with the conveyor supported in a lowered, level position.
Figure 9:
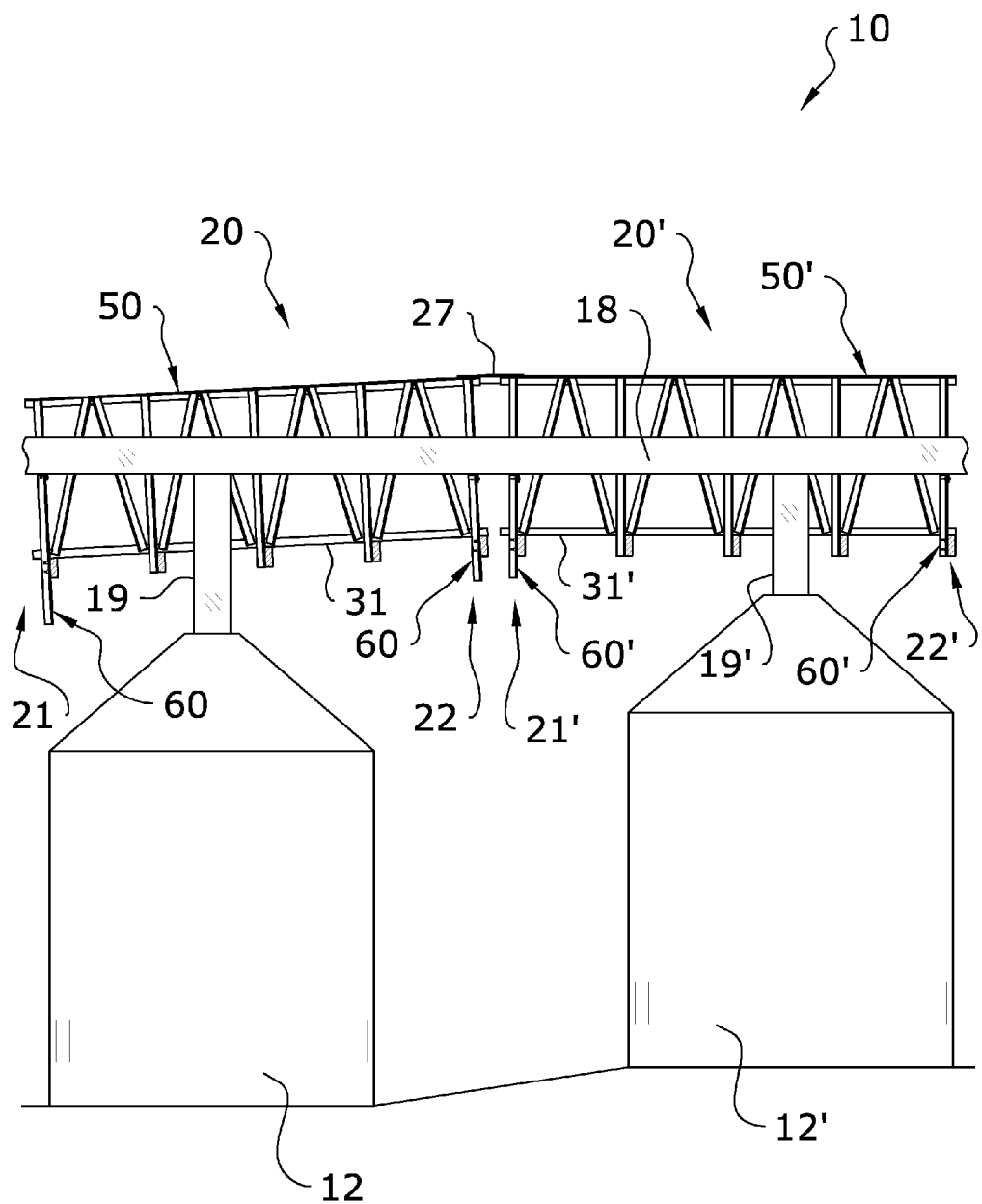
FIG. 9 is an exemplary side view of a first and second raised section, connected to each other via connecting brackets, with the walkways not continuously level or flush and the conveyor supports arranged in a manner to support the conveyor at in a level position.

The catwalk 30 of the raised section 20 provides means for permitting persons to walk along the conveyor 18 and between storage receptacles 12. The catwalk 30 also provides means for supporting the conveyor supports 60 which in turn supports the conveyor 18. The catwalk 30 generally includes a walkway 31, comprised of an elongated and generally flat surface as shown in FIGS. 1 and 2. The walkways 31, 31' of adjacent raised sections 20, 20' generally align with each other in a flush and consistent manner regardless of the position of the conveyor supports 60, 60' and angular disposition of the conveyors 18, 18'; however for uneven terrain or other circumstantial features, the walkways 31, 31' may not align as shown in FIG. 9. It is also appreciated that the walkways 31 as well as the rail assemblies 50, 55 may overlap among adjacent raised sections 20, 20'. The walkway 31 may also include a plurality of openings (not shown) or gripping structure to reduce the likelihood of ice or water buildup and to reduce slippage.

Figure 5:
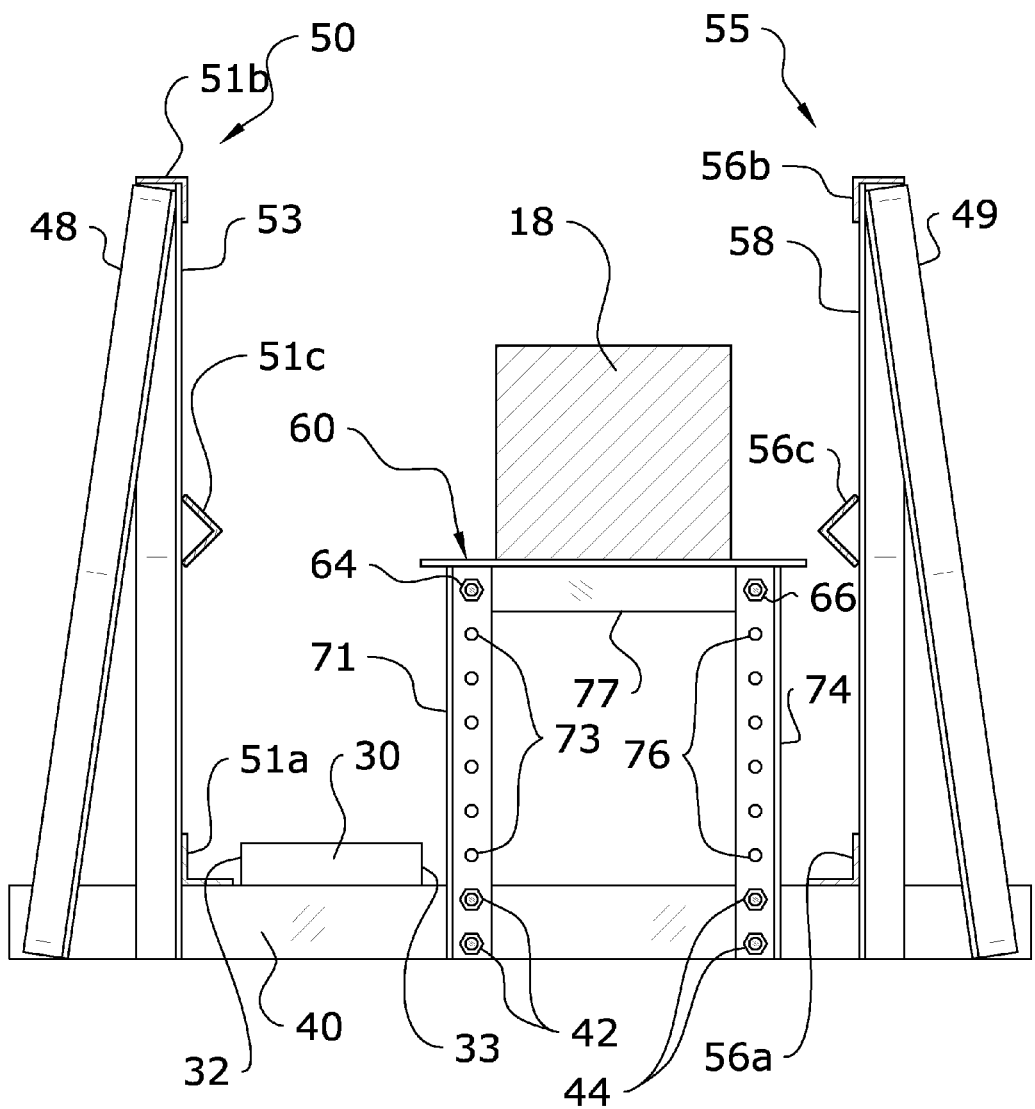
FIG. 5 is an end view of the raised section with the conveyor supported in a raised position.
Figure 6:
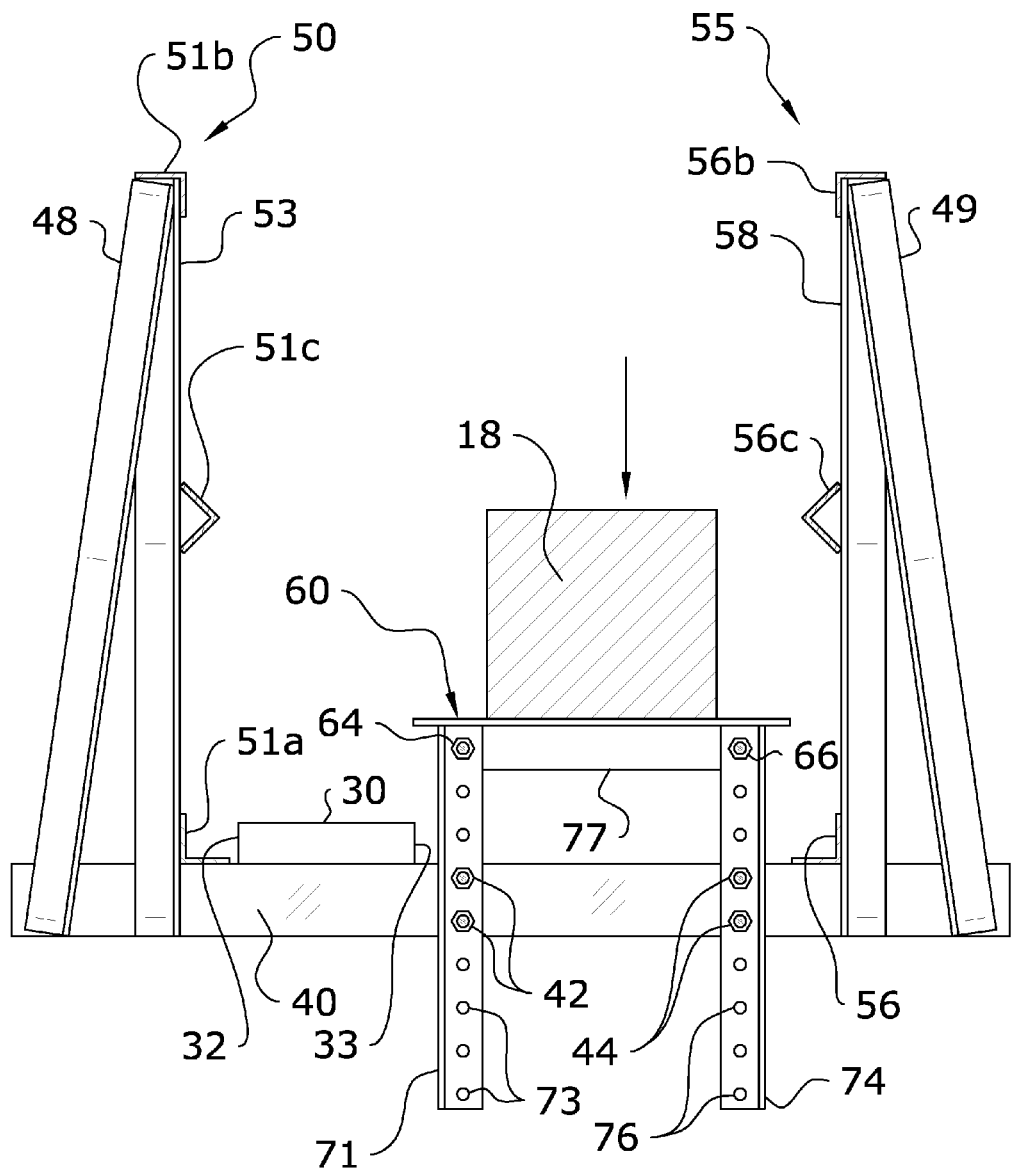
FIG. 6 is an exemplary side view of a first and second raised section connected to each other, with the walkways substantially flush and the conveyor supports arranged in a continuous inclined manner to support the conveyor at an inclined angular disposition.

Supporting the walkway 31 are a plurality of lower supports 40, 46 as shown in FIGS. 1 and 2. The lower supports 40, 46 generally perpendicularly, traverse the walkway 31 and are connected thereto and positioned below a lower surface of the walkway 31. The lower supports 40, 46 are generally elongated and extend beyond opposing lateral sides 32, 33 of the walkway 31 for additionally supporting the rail assemblies 50, 55 and the conveyor supports 60. The conveyor supports 60 are generally positioned along-side of the walkway 31 thus requiring the length that the lower supports 40, 46 extending laterally beyond the walkway 31 to be greater on one side than the other as illustrated in FIGS. 5 and 6.

Generally, the catwalk 30 includes a plurality of alternating and evenly-spaced first lower supports 40 and second lower supports 46, with the first lower supports 40 generally including the openings for receiving fasteners 42, 44 for connecting the conveyor supports 60. The first lower supports 40 are also generally longer than the second lower supports 46 to allot space for the angled braces 48, 49 to connect thereto and support the respective rail assembly 50, 55.

The guard rails 50, 55 of the catwalk 30 generally comprise a first rail assembly 50 located adjacent the walkway 31 and connected along a first end of the lower supports 40, 46 and a second rail assembly 55 located adjacent the conveyor supports 60 and connected along an opposing, second end of the lower supports 40, 46 and thus separated from the opposing side of the walkway 31 via the conveyor supports 60. The first rail assembly 50 and the second rail assembly 55 are generally comprised of identical or substantially similar structures.

Each of the rail assemblies 50, 55 may also be completely disassembled as partially illustrated in FIG. 3.

The rail assemblies 50, 55 each include a lower horizontal rail 51a, 56a that extends along a top surface of the lower supports 40, 46, one of the lower horizontal rails 51a alongside the walkway 31 on a first side 32 and the other lower horizontal rail 56a alongside the conveyor supports 60. The lower horizontal rails 51a, 56a are preferably connected to the lower supports 40, 46 for supporting the rail assemblies 50, 55.

At an opposing vertical end of the rail assemblies 50, 55 and paralleling the lower horizontal rails 51a, 56a are first and second upper horizontal rails 51b, 56b that serve as hand rails. Each of the lower horizontal rails 51a, 56a and the upper horizontal rails 51b, 56b preferably include a series of openings 52a, 52b and 57a, 57b along each end for receiving openings and fasteners 28 of a respective connecting bracket 27 when attaching two raised sections 20, 20' together. The connecting brackets 27 are preferably comprised of an L-shaped angle-iron shape to match the lower horizontal rails Ma, 56a and the upper horizontal rails 51b, 56b. Additionally, one or more intermediate horizontal rails 51c, 56c may be located along each rail assembly 50, 55. Further, the sections 20, 20' may be overlapped and the rail assemblies and/or walkways of each section 20, 20' directly connected rather than using the connecting brackets 27.

Each rail assembly 50, 55 also generally includes a plurality of vertical rails 53, 58, each vertical rail 53, 58 connected on a lower end to a respective end of a lower support 40, 46 and lower horizontal rail 51a, 56a and connected on an upper end to a respective upper horizontal rail 51b, 56b. Additionally, each rail assembly 50, 55 includes a plurality of angled rails 54, 59 connected forming inverted V-shapes between each of the vertical rails 53, 58. The angled braces 48, 49 are connected at each of the ends of the first lower supports 40 to the respective rail assembly 50, 55. Each of the rails and braces are generally comprised of a metal material and angle-iron shape for superior strength and durability.

ii. Conveyor Supports

Each raised section 20 includes a plurality of conveyor supports 60, generally at least one along an opposing end and generally one or more conveyor supports 60 between thereof, such as intermediate to the first end and the second end of the raised section 20. Each of the conveyor supports 60 are able to be independently adjusted in a vertical manner relative the walkway 31 and relative each other.

The conveyor supports 60 may be independently vertically adjusted to accommodate for a conveyor 18 having an angular disposition as illustrated in FIG. 7, multiple staggered conveyors 18, 18' such as when a first conveyor 18 dumps into a second conveyor 18 as illustrated in FIG. 8, when the conveyor 18 is preferred to be level even though the walkway 31 is not level as illustrated in FIG. 9, all of which accommodate for different height storage receptacles, or varying terrain, among others.

Each of the conveyor supports 60 generally are attached to each first lower support 40 and are comprised of an inverted U-shaped structure having a vertical section 70 that is vertically adjusted relative the first lower support 40 and a horizontal section 77 supported by the vertical section 70, wherein the conveyor 18 or housing of the conveyor 18 is supported atop or affixed to the horizontal section 77. It is appreciated that alternate methods of attachment may be appreciated, such as where the conveyor 18 is attached to the vertical section 70.

Each vertical section 70 generally includes a first vertical support 71 and a spaced apart and parallel second vertical support 74. The vertical supports 71, 74 generally each include an upper opening 72, 75 for aligning with an opening 78, 79 of the horizontal section 77 and being attached thereto in a fixed and non-adjustable manner via fasteners 64, 66, such as bolts.

The vertical supports 71, 74 also generally include a plurality of adjustment openings 73, 76 extending along the length of the vertical supports 71, 74 in an evenly-spaced apart manner for incrementally adjusting the height of the horizontal section 77 and thus conveyor 18 relative the first lower support 40 and the catwalk 30. The first adjustment openings 73 align with one or more first openings of the first lower support 40 and the second adjustment openings 76 align with one or more second openings of the first lower support 40 to connect the first vertical support 71 and the second vertical support 74 to the first lower support 40 via fasteners 42, 44, such as bolts.

In a preferred embodiment, each of the vertical supports 71, 74 are adjusted evenly relative the first lower supports 40. Each of the supports 71, 74 of the vertical section 70 and the horizontal section 77 are also generally comprised of a metal material and angle-iron shape for superior strength and durability.

E. Operation of Preferred Embodiment

In use, a desired number of raised sections 20 are connected between storage receptacles 12 in a linear manner via the connecting brackets 27 or overlapping the raised sections 20. The conveyor supports 60 are vertically adjusted to an overall angular disposition that parallels the preferred angular disposition of the one or more conveyors 12 and the conveyor 12 is secured atop the conveyor supports 60 for transferring the granular material.

In particular, a first raised section 20 having a first end 21 and a second end 22 may have the conveyor supports 60 adjusted in to form an inclined overall support for the conveyor 12, a level overall support for the conveyor 12, or a declined support. Similarly, a second raised section 20' having a third end 21' and a fourth end 22' may have the conveyor supports 60' adjusted in to form an inclined overall support for the conveyor 18', a level overall support for the conveyor 18', or a declined support. The angle formed by the first conveyor supports 60 may be the same as or different from the angle formed by the second conveyor supports 60'. The walkways 30, 30' of the first and second raised sections 20, 20' may be flush or uneven.

The walkways 30, 30' are preferably adjoined in a flush manner; however a non-flush manner may be required due to uneven terrain, etc., wherein the conveyor supports 60, 60' of the first and second raised sections 20, 20' may still be arranged in an inclined, declined, or level manner. It is appreciated that more or less raised sections 20 may be utilized as needed according to the length of the sections 20 and the length between storage receptacles 12, 12'.

If the raised sections 20 are desired to be transported or stored, each member of the raised sections 20 may be disconnected via removing a bolt or other removable fastener thus permitting for compact storage and transport. It is also appreciated that the raised sections 20 may differ in length or number of conveyor supports 60 as needed.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A system for transferring granular material to one or more storage receptacles, comprising:
   a first storage receptacle;
   a second storage receptacle;
   a catwalk having a walkway and one or more guard rails, wherein said catwalk extends between said first storage receptacle and said second storage receptacle;
   a plurality of conveyor supports each having a vertical section and a horizontal section, wherein said vertical section is adjustably connected to said catwalk and wherein said horizontal section vertically adjusts with respect to said catwalk via vertical adjustment of said vertical section;
   wherein each of said plurality of conveyor supports are arranged in a linear manner, and wherein each of said plurality of conveyor supports independently adjust relative each other and relative said catwalk; and
   one or more conveyors for transporting granular material to said first storage receptacle and/or said second storage receptacle, wherein said one or more conveyors are supported upon said horizontal sections of said plurality of conveyor supports, wherein an angular disposition of said one or more conveyors relative said catwalk is adjusted via vertical adjustment of one or more of said plurality of conveyor supports.

2. The system for transferring granular material of claim 1, wherein each of said conveyor supports is comprised of an inverted U-shaped structure.

3. The system for transferring granular material of claim 1, wherein said vertical section has a plurality of adjustment openings for incremental adjustment.

4. The system for transferring granular material of claim 1, wherein each of said plurality of conveyor supports include a first vertical support having a first upper opening and a plurality of first adjustment openings, wherein said plurality of first adjustment openings are evenly-spaced along a first length of said first vertical support and wherein each of said plurality of conveyor supports include a second vertical support having a second upper opening and a plurality of second adjustment openings, wherein said plurality of second adjustment openings are evenly-spaced along a second length of second first vertical support, wherein said first vertical support and said second vertical support incrementally adjust in a vertical manner relative said catwalk, wherein said horizontal section has a first end opening and a second end opening, wherein said first end opening aligns with said first upper opening of said first vertical support for attachment thereto and wherein said second end opening aligns with said second upper opening of said second vertical support for attachment thereto.

5. The system for transferring granular material of claim 1, wherein said plurality of conveyor supports include a first conveyor support, a second conveyor support, and a third conveyor support, wherein said first conveyor support is adjusted to a first vertical height, wherein said second conveyor support is adjusted to a second vertical height, and wherein said third conveyor support is adjusted to a third vertical height, wherein said first vertical height, said second vertical height and said third vertical height are each different relative said catwalk.

6. The system for transferring granular material of claim 1, wherein said catwalk includes a plurality of lower supports for supporting said walkway and said one or more guard rails.

7. The system for transferring granular material of claim 6, wherein said plurality of lower supports support said plurality of conveyor supports.

8. The system for transferring granular material of claim 7, wherein said plurality of conveyor supports adjustably connect to said plurality of lower supports.

9. The system for transferring granular material of claim 1, wherein said one or more guard rails includes a first rail assembly positioned along a first longitudinal side of said walkway and a second rail assembly positioned along a second longitudinal side of said walkway, wherein said plurality of conveyor supports are located between said second rail assembly and said second side of said walkway.

10. The system for transferring granular material of claim 1, wherein said first rail assembly and said second rail assembly each include a plurality of horizontal rails, a plurality of vertical rails, and a plurality of angled rails.

11. A catwalk assembly for extending between storage receptacles, comprising:
    a first storage receptacle;
    a second storage receptacle;
    a first raised section having a first walkway, a first rail assembly, and a second rail assembly, wherein said first raised section extends between said first storage receptacle and said second storage receptacle;
    wherein said walkway is removably connected with respect to said first rail assembly and said second rail assembly, and wherein each of said rail assemblies include a plurality of horizontal rails, a plurality of vertical rails, and a plurality of angled rails, wherein said plurality of horizontal rails, said plurality of vertical rails, and said plurality of angled rails are removably connected to each other thus permitting disassemblage of said first raised section;
    wherein said first raised section includes a plurality of lower supports, wherein said plurality of lower supports traverse said walkway, wherein said plurality of lower supports are removably connected to said first rail assembly along a first end of said plurality of lower supports and said second rail assembly along a second end of said plurality of lower supports, wherein said walkway is removably connected to said plurality of lower supports between said first rail assembly and said second rail assembly; and
    wherein said plurality of lower supports are spaced apart along a length of said walkway;
    a plurality of conveyor supports removably connected to at least some of said plurality of lower supports, wherein said plurality of conveyor supports are adjustably connected in a vertical manner to said at least some of said plurality of lower supports.

12. The catwalk assembly of claim 11, wherein each of said plurality of conveyor supports include a first vertical support, a second vertical support, and a horizontal support to form an inverted U-shaped structure.

13. The catwalk assembly of claim 12, wherein each of said first vertical support and said second vertical support include a plurality of adjustment openings for vertical adjustment along said at least some of said plurality of lower supports.

14. The catwalk assembly of claim 11, including a second raised section having a substantially identical structure to said first raised section, wherein said second raised section removably connects to said first raised section in a linear manner.

15. The catwalk assembly of claim 14, wherein said second raised section at least partially overlaps said first raised section.

16. A system for transferring granular material to one or more storage receptacles, comprising:
- a catwalk having a walkway and one or more guard rails, wherein said catwalk extends between one or more storage receptacles;
- a plurality of conveyor supports each having a vertical section and a horizontal section, wherein said vertical section is adjustably connected to said catwalk and wherein said horizontal section vertically adjusts with respect to said catwalk via vertical adjustment of said vertical section;
- wherein each of said plurality of conveyor supports are arranged in a linear manner, and wherein each of said plurality of conveyor supports independently adjust relative each other and relative said catwalk; and
- one or more conveyors for transporting granular material to said one or more storage receptacles, wherein said one or more conveyors are supported upon said horizontal sections of said plurality of conveyor supports, wherein an angular disposition of said one or more conveyors relative said catwalk is adjusted via vertical adjustment of one or more of said plurality of conveyor supports;
- wherein each of said conveyor supports is comprised of an inverted U-shaped structure;
- wherein each of said plurality of conveyor supports include a first vertical support having a first upper opening and a plurality of first adjustment openings, wherein said plurality of first adjustment openings are evenly-spaced along a first length of said first vertical support and wherein each of said plurality of conveyor supports include a second vertical support having a second upper opening and a plurality of second adjustment openings, wherein said plurality of second adjustment openings are evenly-spaced along a second length of second first vertical support, wherein said first vertical support and said second vertical support incrementally adjust in a vertical manner relative said catwalk, wherein said horizontal section has a first end opening and a second end opening, wherein said first end opening aligns with said first upper opening of said first vertical support for attachment thereto and wherein said second end opening aligns with said second upper opening of said second vertical support for attachment thereto;
- wherein said plurality of conveyor supports include a first conveyor support, a second conveyor support, and a third conveyor support, wherein said first conveyor support is adjusted to a first vertical height, wherein said second conveyor support is adjusted to a second vertical height, and wherein said third conveyor support is adjusted to a third vertical height, wherein said first vertical height, said second vertical height and said third vertical height are each different relative said catwalk;
- wherein said catwalk includes a plurality of lower supports for supporting said walkway and said one or more guard rails and wherein said plurality of lower supports support said plurality of conveyor supports;
- wherein said plurality of conveyor supports adjustably connect to said plurality of lower supports;
- wherein said one or more guard rails includes a first rail assembly positioned along a first longitudinal side of said walkway and a second rail assembly positioned along a second longitudinal side of said walkway, wherein said plurality of conveyor supports are located between said second rail assembly and said second side of said walkway;
- wherein said first rail assembly and said second rail assembly each include a plurality of horizontal rails, a plurality of vertical rails, and a plurality of angled rails.

* * * * *